B. MARSHALL & SARAH N. MARSHALL.

Broiler.

No. 132,167.    Patented Oct. 15, 1872.

Witnesses.
C. F. Brown
H. Carlin Clark

Inventor.
Benjamin Marshall & S. N. Marshall
by Dyer, Beadle & Co.
Attys.

UNITED STATES PATENT OFFICE.

BENJAMIN MARSHALL AND SARAH N. MARSHALL, OF MARIETTA, OHIO.

IMPROVEMENT IN BROILERS.

Specification forming part of Letters Patent No. 132,167, dated October 15, 1872; antedated October 12, 1872.

*To all whom it may concern:*

Be it known that we, BENJAMIN MARSHALL and SARAH N. MARSHALL, of Marietta, in the county of Washington and State of Ohio, have invented a new and useful Improvement in Broilers; and we do hereby declare that the following is a full and exact description of the same, reference being had to the accompanying drawing and to the letters of reference marked thereon.

This invention has for its object the production of a device adapted for broiling meat and other articles of food by means of reflected heat; and consists, mainly, in specific details of construction relating to the adjustment of the position of the broiler, as will be fully described hereinafter.

Figure 1:
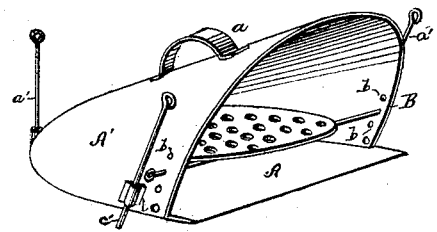
Figure 2:
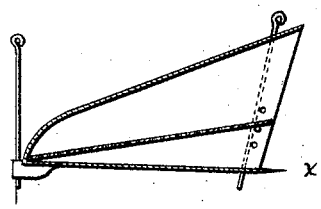
Figure 3:
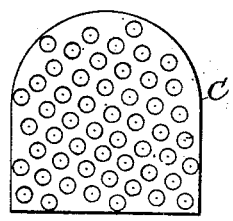
Figure 4:
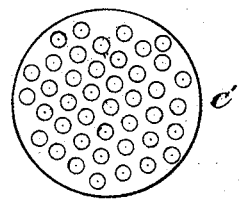

In the drawing, Figure 1 represents a perpendicular view of our improved broiler; Fig. 2, a central sectional elevation; and Figs. 3 and 4, plan views of the grates.

To enable others skilled in the art to make and use our invention, we will now proceed to describe fully its construction and manner of operation.

A A' represent the reflectors, which constitute the main portion of our invention. The part A consists of a suitable piece of flat or curved metal cut in semicircular form, and having its straight edge slightly turned up, as shown at *x*. Its rear side may also be shaped into concave form in order that the heat may readily strike that part. The part A' also consists of a suitable piece of metal, one edge of which is curved to correspond with the curved edge of the part A, to which it is united, and the other is curved to form an arch, as is clearly shown in the drawing. The part A' is preferably curved also at the rear side, for the purpose of giving abundance of room at the back of the broiler for the food which is to be cooked. The broiler, thus constructed of the parts A A', is provided with a proper handle, *a*, and with adjustable legs *a' a' a'*, by means of which latter its position before the fire can be readily adjusted. B represents a supporting-rod, which may be adjusted to a higher or lower position by means of the holes *b b*. C C' represent grates of different form, which are adapted to be supported by the rod B and by the rear end of the part A, as shown.

The manner of using our improved broiler is as follows: The open mouth of the broiler is placed before any suitable open fire, its height being regulated by means of its adjustable feet, and the proper incline being also given to it by the same means. The article to be cooked is placed upon the grate, in which position it is acted upon by the heat collected by the reflectors above and below, and concentrated upon the food. If the circular grate is used, it may be revolved, to insure the equal cooking of all portions of the article being cooked.

The advantages of this device will be readily perceived. The meat or other article exposed is cooked entirely by reflected heat, and there is consequently no possibility of its being affected by gas or smoke. The broiler may be used in front of an open fire without interfering with the other parts of the stove, which may, if desired, be used for other purposes. The article exposed receives heat on each side at the same time, and consequently the operation of cooking is very quickly performed. The lower reflector being inclined toward the rear the gravy is conducted away from the fire, so that it is not injured by burning. The broiler may be used for roasting by dropping the grate to its lowest point. It may be also used for broiling before extremely low stoves or fire-grates.

Having thus fully described our invention, what we claim as new, and desire to secure by Letters Patent, is—

1. The combination of the reflectors with the adjustable feet, adapted to regulate the height and incline of the reflectors, as described.

2. The described device, consisting of the reflectors A A', adjustable lugs *a' a' a'*, adjustable rod B, and grate C or C', as described, for the purpose set forth.

This specification signed and witnessed this 3d day of February, 1872.

BENJ. MARSHALL.
    SARAH N. MARSHALL.

Witnesses:
 THOS. W. EWART,
 THOMAS EWART.